United States Patent
Muller

(10) Patent No.: US 6,665,550 B1
(45) Date of Patent: Dec. 16, 2003

(54) COMPACT PORTABLE MOBILE TELEPHONE HAVING A BATTERY THAT CONSTITUTES VIRTUAL ALL OF A FLAP

(75) Inventor: Jacques Muller, Jouy le Moutier (FR)

(73) Assignee: Alcatel Radiotelephone, Paris (FR)

( * ) Notice: Subject to any disclaimer, the term of this patent is extended or adjusted under 35 U.S.C. 154(b) by 981 days.

(21) Appl. No.: 09/002,950

(22) Filed: Jan. 5, 1998

Related U.S. Application Data

(63) Continuation of application No. 08/214,418, filed on Mar. 18, 1994, now abandoned.

(30) Foreign Application Priority Data

Mar. 23, 1993 (FR) .............................................. 93 03315

(51) Int. Cl.⁷ ................................................ H04M 1/00
(52) U.S. Cl. .................................. 455/575.1; 455/575.3
(58) Field of Search .......................... 455/90, 575, 133, 455/128, 89, 558, 575.1, 575.3; 379/433, 38, 434; 343/702, 742; 380/21

(56) References Cited

U.S. PATENT DOCUMENTS

| | | | | |
|---|---|---|---|---|
| 4,845,772 A | * | 7/1989 | Metroka et al. | |
| 5,117,073 A | * | 5/1992 | Mischenko | ................. 379/433 |
| 5,251,329 A | * | 10/1993 | Takagi et al. | ................. 455/89 |
| 5,260,998 A | * | 11/1993 | Takagi | ........................ 379/433 |
| 5,278,993 A | | 1/1994 | Reiff et al. | |
| 5,335,276 A | * | 8/1994 | Thompson et al. | ............ 380/21 |
| 5,548,824 A | * | 8/1996 | Inubushi et al. | ............... 455/90 |
| 5,711,013 A | * | 1/1998 | Collett et al. | ................ 455/558 |
| 5,832,079 A | * | 11/1998 | Rabe | .......................... 379/433 |
| 5,915,015 A | * | 6/1999 | Thornton | ..................... 379/433 |

FOREIGN PATENT DOCUMENTS

| | | |
|---|---|---|
| AU | 8367691 | 2/1993 |
| EP | 0445808 A1 | 9/1991 |
| EP | 275996 | 7/1998 |
| FR | 2601211 | 1/1988 |
| JP | 0125027 | 5/1989 |
| JP | 5153216 | 6/1993 |
| WO | WO9114332 | 9/1991 |

OTHER PUBLICATIONS

Cloke, "Stromversorgung. Schnurloser Telefonapparate", Natchrichtentechnische Zeitschrift, vol. 40, No. 4, Apr. 1987, pp. 302–303.

* cited by examiner

*Primary Examiner*—William Cumming
(74) *Attorney, Agent, or Firm*—Sughrue Mion, PLLC

(57) ABSTRACT

A telephone includes a body carrying an earpiece at one end and a flap at the other end integrating a microphone or reflecting sound towards a microphone. The flap can be foldable between a position to receive the sound of the voice and a folded position to reduce the overall size of the telephone when it is not in use or is on standby. The battery inserts in a cavity of a base of the flap so that when fitted it is integrated into the flap. Its use reduces the overall thickness of the telephone and makes it easier to handle.

9 Claims, 4 Drawing Sheets

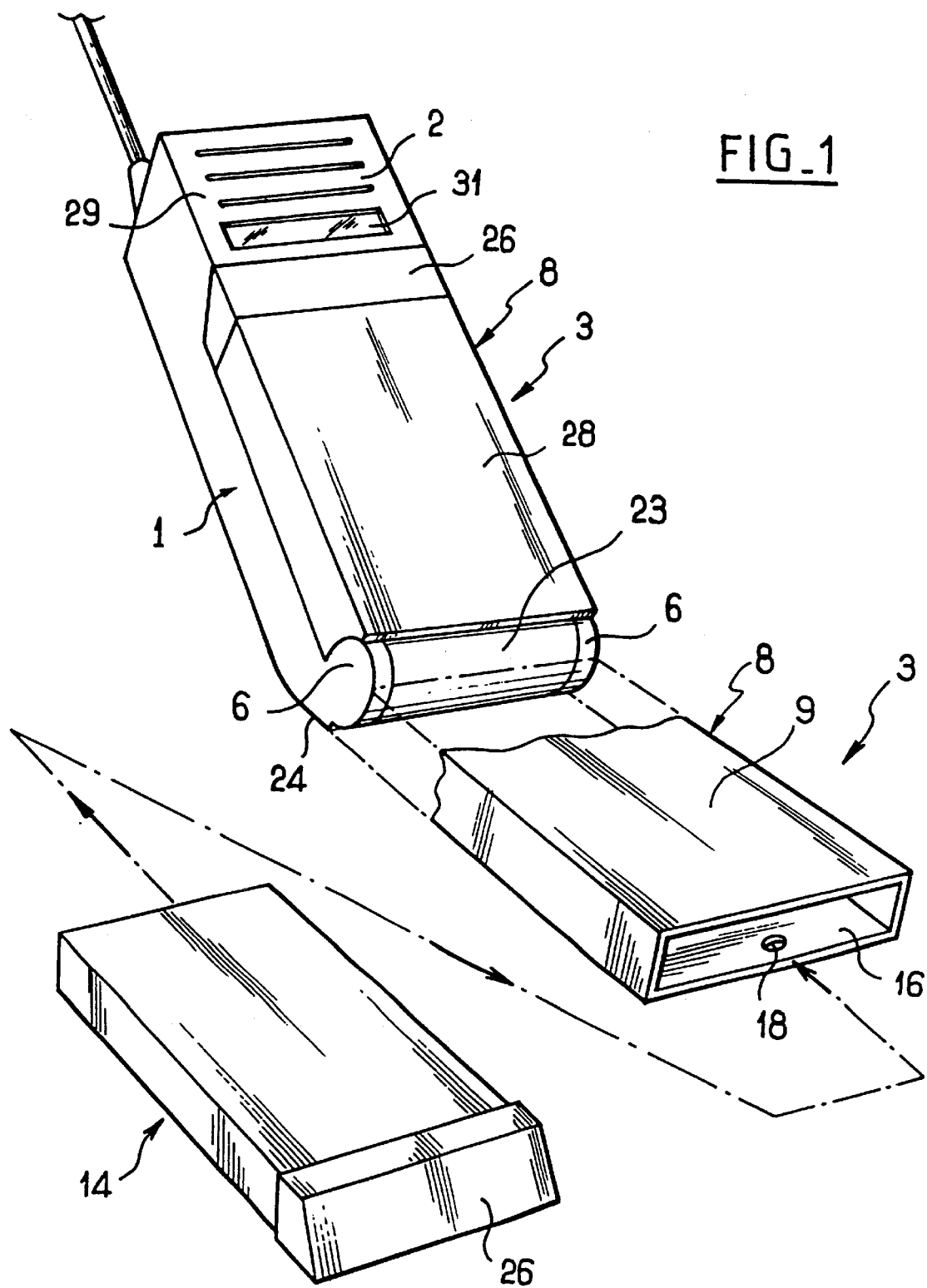
FIG_1

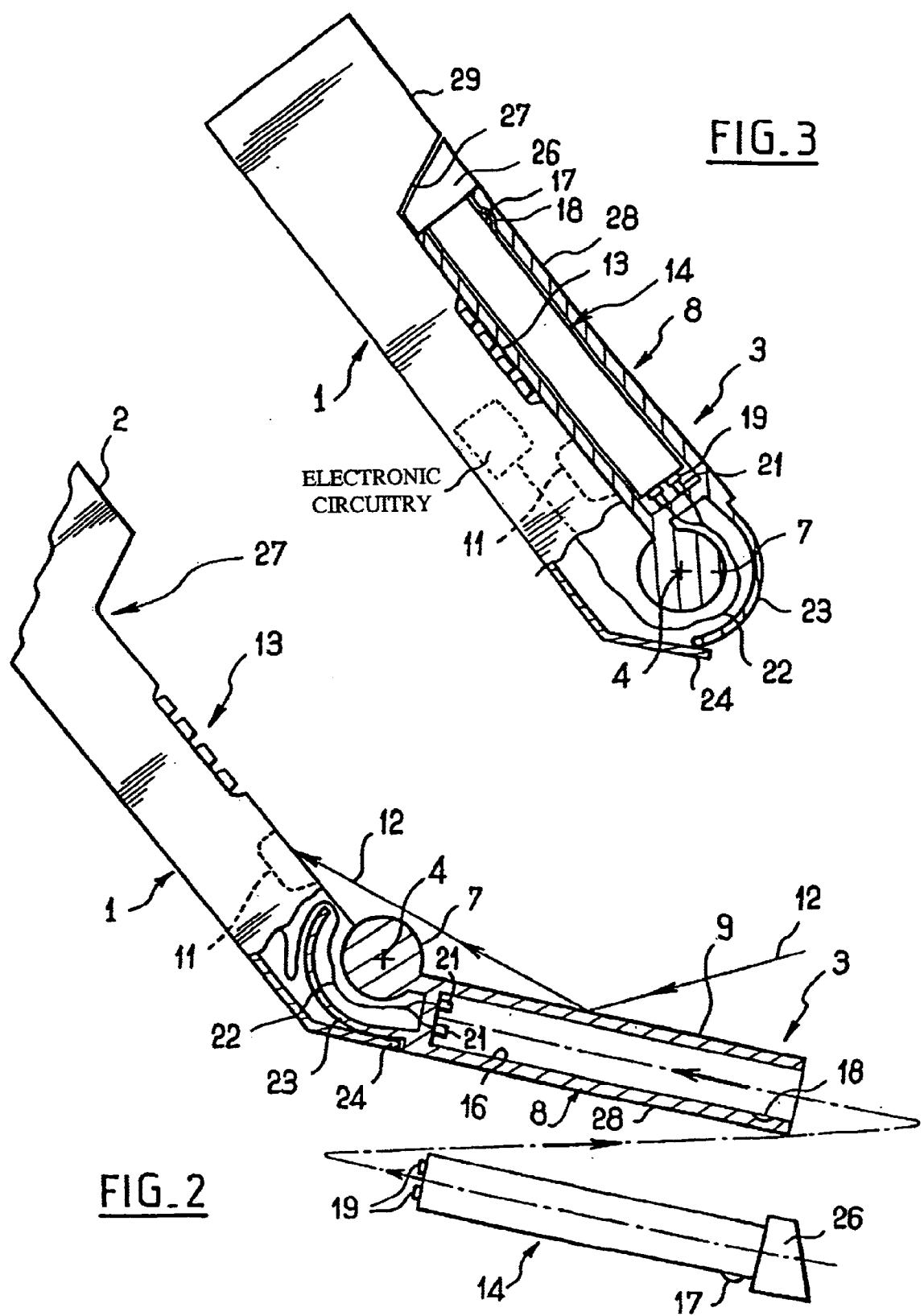

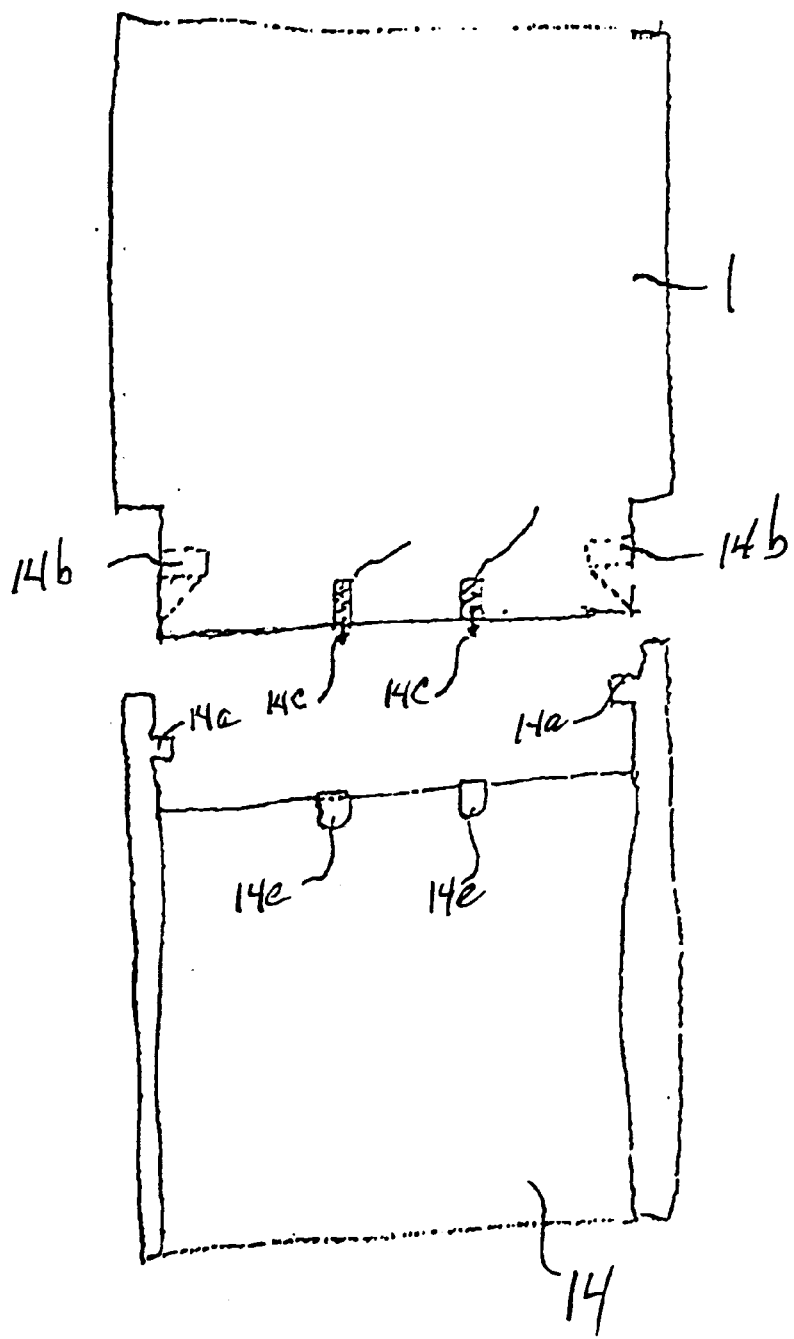

COMPACT PORTABLE MOBILE TELEPHONE HAVING A BATTERY THAT CONSTITUTES VIRTUAL ALL OF A FLAP

This application is a continuation of Ser. No. 08/214,418 filed Mar. 18, 1994 now abandoned.

BACKGROUND OF THE INVENTION

1. Field of the Invention

The present invention concerns a compact portable mobile telephone.

2. Description of the Prior Art

A mobile telephone has an earpiece, a microphone, a keypad for dialling and transceiver means. It must be as compact as possible for easy manipulation near the face of the user during calls and must take up as little space as possible when not in use.

It often comprises a battery to supply power removably mounted on the side of the casing that faces away from the face during a call. This makes it somewhat thick so that it is uncomfortable to hold during a call.

Some portable mobile phones include a flap designed to be disposed substantially in front of the user's mouth to pick up the sound of the voice. This flap contains the microphone or is merely an inert reflector redirecting the sound towards a microphone nearer the earpiece. The current trend is to have this flap pivoted so that when not in use it can be folded over the keypad to shorten the overall length. To prevent any increase in thickness, the flap is then made as thin as possible.

The aim of the invention is to propose a device that is easy to manipulate and is also more compact when not in use.

SUMMARY OF THE INVENTION

According to the invention, the portable mobile telephone comprising a body, a flap hinged to said body to move between an operative position in which it is located in front of the mouth of the user and a position folded on top of said body and a removable battery which is integrated into the flap when fitted.

By virtue of this arrangement the thickness of the body of the device is no longer increased by the battery. To the contrary, the flap is larger and its transverse cross-section is in the same order of magnitude as that of the body. The phone is easier to hold because the body is thinner.

The flap is longer than in prior art implementations. If it is hinged, the terminal is shorter when folded, reducing its overall size. The overall length of the telephone when the flap is deployed does not vary much because it depends on the distance between the mouth and the ear of the average user.

Other features and advantages of the invention emerge from the following description relating to a non-limiting example.

BRIEF DESCRIPTION OF THE DRAWINGS

In the appended drawings:

FIG. 1 is a view of the telephone folded, also showing part of the base of the flap when deployed, and the battery for insertion therein;

FIG. 2 is a partial view of the telephone, partially in cross-section, with the battery ready to be inserted into the deployed flap;

FIG. 3 is a figure analogous to FIG. 2 but with the flap folded and the battery in place, FIG. 5 is a schematic view of a portion of FIG. 4, and shows a manner in which the battery may be articulated to the body of a telephone.

DETAILED DESCRIPTION OF THE PREFERRED EMBODIMENT

Figure 4:
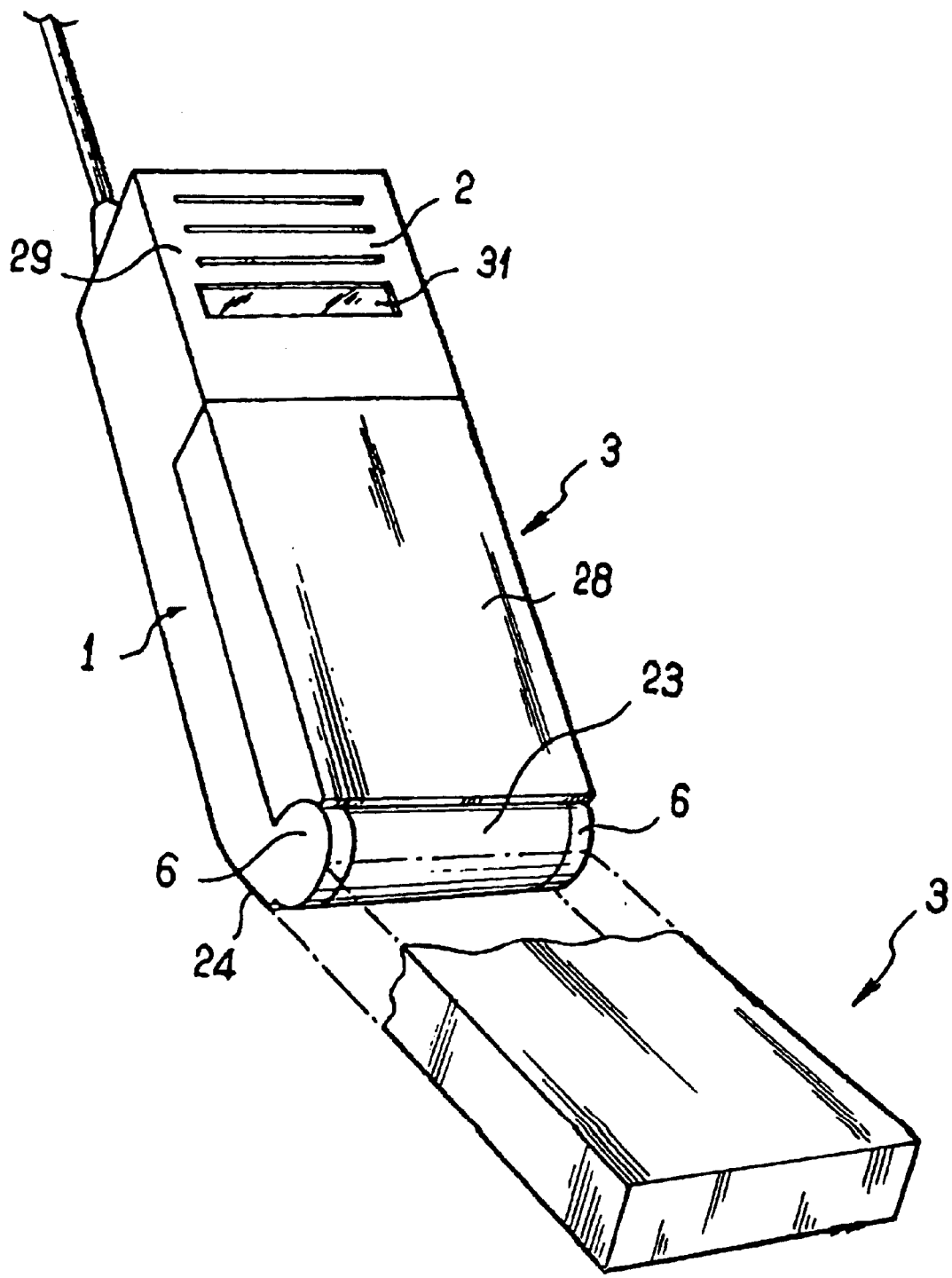
FIG. 4 is a view of an alternative embodiment of the telephone, wherein the battery constitutes the flap.

In the example shown in the figures, the telephone comprises a body 1 with an earpiece 2 on the front near one end. At the other end the body 1 is hinged to a folding flap 3 which pivots about an axis 4 between the deployed position shown in FIG. 2 and the folded position shown in FIG. 3. As shown in FIG. 1, the pivot means comprise, for example, two flanges 6 on the body 1 (FIG. 1) to which is articulated a journal 7 on a base 8 of the flap 3 (FIGS. 2 and 3).

When the flap 3 is deployed (bottom of FIG. 1 and FIG. 2), a front side 9 of the base 8 is facing the mouth of the user making a call. The side 9 reflects the sound of the voice towards a microphone 11 on the front side of the body 1 between the pivot axis 4 and the earpiece 2. The arrow 12 shows the path taken by the sound.

When the flap 3 is in the folded position it covers part of the front side of the body including the microphone 11 and a keypad 13 for dialling.

The telephone further comprises a removable battery 14 which, according to the invention, is integrated into the flap 3 when fitted.

To this end the base 8 is in the form of a flattened rectangular tube open at a front side of its periphery at the end opposite the pivot axis 4 and closed at the same end as the pivot axis 4. The battery 14 fits like a drawer into the parallelepiped-shape housing 16 defined by this tube. At the end of insertion a boss 17 on the battery 14 engages in a complementary recess 18 on the interior wall of the base 8 to lock the battery in place.

The battery 14 is a rechargeable nickel-cadmium battery or preferably a nickel-metal-hydrogen (Ni(m)H) battery or even more preferably a rechargeable lithium battery. This order of preference represents the order of increasing compactness.

On its front side, relative to the direction of insertion, the battery 14 carries at least two rigid contacts 19 which when the battery 14 is locked into the base 8 bear against two spring contacts 21 at the far end of the housing 16. The two contacts 21 are connected by a flexible cable 22 to the electronic circuitry inside the body 1. The cable 22 is preferably a flat copper cable.

The cable 22 can travel between the journal 7 and a cylindrical sector shaped tongue 23 which is also part of the base 8, for example. The tongue 23 is coaxial with the journal 7 and surrounds the latter at a certain radial distance therefrom. The casing 1 has on its rear side a lip 24 providing some degree of sealing with the tongue 23 regardless of the angular position of the base 8 relative to the casing 1, and in particular at the two extreme positions.

The battery 14 has at the end opposite the rigid contacts 9 a holding area 26 which remains visible outside the housing 16 when the battery 14 is in the operative position.

The front side of the body 1 has, in the area covered by the folded flap 3, a recess 27 deep enough to accommodate the thickness of the folded flap, so that a rear side 28 of the flap 3 is substantially aligned with the unrecessed part 29 of the front side when the flap is folded. As shown in FIG. 1, this area 29 includes, in addition to the earpiece 2, a display 31 enabling the user to receive information even when the flap 3 is folded, i.e. when the telephone is on standby. Of course, the invention is not limited to the example described and shown.

The flap could be fixed.

If the battery used is compact, especially a rechargeable lithium battery, the microphone can be accommodated in the flap to pick up the voice directly rather than by reflection.

The battery can be inserted laterally into the flap, into a lateral opening of the base, for example.

It is equally feasible for the battery to constitute in itself virtually all of the flap and in particular to define the surface from which sound is reflected towards the microphone. In this case the base is no more than a short mount hinged to the body. The base can even be dispensed with entirely as shown in FIG. 4, the battery then including articulation means 14a which snap onto complementary means 14b carried by the body 1, this articulation incorporating a system of rotary contacts 14c, 14e.

What is claimed is:

1. A portable mobile telephone, comprising:
a body, a removable battery, and a flap hinged to said body to move between an operative position in which the flap is located in front of the mouth of a user, and a second position folded on top of said body, wherein said flap forms a sound reflector which, in said operative position, redirects the sound of the user's voice from said flap to a microphone in said body inboard of said flap, and wherein said removable battery constitutes virtually all of said flap so that said battery, itself, forms said reflector.

2. The telephone according to claim 1, wherein said sound reflector is formed only by a surface of said battery, and said hinged flap is free of any switching unit, microphone and logic unit, said battery being the primary power source of said telephone and providing power to operate electronic circuitry within said body.

3. The telephone according to claim 1, wherein said battery itself constitutes said flap, said battery including articulation means which snap onto complementary means carried by said body.

4. A portable mobile telephone, comprising:
a body; and
a flap hinged to said body to move between an operative position in which said flap is located in front of the mouth of a user, and a second position folded on top of said body; said flap comprising a battery and a base which is mounted on only an end of said battery and which is hinged to said body, wherein said flap forms a sound reflector which, in said operative position, redirects the sound of the user's voice from said flap to a microphone in said body inboard of said flap, and said hinged flap being free of any switching unit, microphone and logic unit said battery being the primary power source of said telephone.

5. The telephone according to claim 4, wherein the battery carries at least two rigid contacts on the end mounted to said base, whereby when said battery is locked into said base, the contacts bear against spring contacts provided in said base.

6. The telephone according to claim 4, wherein said battery is a rechargeable battery.

7. The telephone according to claim 4, wherein said body includes a display which is visible when said flap is folded on top of said body.

8. A portable mobile telephone, comprising:
a body; and
a flap hinged to said body to move between an operative position in which the flap is located in front of the mouth of the user, and a second position folded on top of said body, said flap consisting essentially only of a removable battery and being free of any switching unit, microphone and logic unit, wherein said flap forms a sound reflector which, in said operative position, redirects the sound of the user's voice from said flap to a microphone in said body inboard of said flap, and said battery being the primary power source for said telephone.

9. The telephone according to claim 1, wherein said removable battery constitutes virtually all of said flap, and wherein said battery includes articulation means which snap onto complementary means carried by said body, said battery being the primary power source of said telephone, and providing power to operate electronic circuitry within said body.

* * * * *